US010540757B1

(12) United States Patent
Bouhnik et al.

(10) Patent No.: US 10,540,757 B1
(45) Date of Patent: Jan. 21, 2020

(54) METHOD AND SYSTEM FOR GENERATING COMBINED IMAGES UTILIZING IMAGE PROCESSING OF MULTIPLE IMAGES

(71) Applicant: Amazon Technologies, Inc., Seattle, WA (US)

(72) Inventors: Moshe Bouhnik, Holon (IL); Hilit Unger, Even-Yehuda (IL); Eduard Oks, Holon (IL); Noam Sorek, Zichron Yaacov (IL)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 15/919,118

(22) Filed: Mar. 12, 2018

(51) Int. Cl.
| | |
|---|---|
| *G06T 5/50* | (2006.01) |
| *G06T 7/11* | (2017.01) |
| *G06T 7/70* | (2017.01) |
| *G06T 7/37* | (2017.01) |
| *G06T 3/40* | (2006.01) |
| *G06N 3/04* | (2006.01) |

(52) U.S. Cl.
CPC ............. *G06T 5/50* (2013.01); *G06N 3/0454* (2013.01); *G06T 3/4084* (2013.01); *G06T 7/11* (2017.01); *G06T 7/37* (2017.01); *G06T 7/70* (2017.01); *G06T 2207/20221* (2013.01)

(58) Field of Classification Search
CPC ..... G06T 5/50; G06T 7/11; G06T 7/37; G06T 7/70; G06N 3/0454
See application file for complete search history.

(56) References Cited

U.S. PATENT DOCUMENTS

2017/0262991 A1* 9/2017 Davidson ............... G06T 11/001
2019/0244407 A1* 8/2019 Wiesel ............... G06K 9/00369

OTHER PUBLICATIONS

Criminisi et al., "Region Filling and Object Removal by Exemplar-Based Image Inpainting," *IEEE Transactions on Image Processing*, vol. 13, No. 9 (Sep. 2004), 13 pages.
Iizuka et al., "Globally and Locally Consistent Image Completion," *ACM Transactions on Graphics*, vol. 36, No. 4, Article 107 (Jul. 2017), 13 pages.
Long et al., "Fully Convolutional Networks for Semantic Segmentation," *IEEE Conference on Computer Vision and Pattern Recognition* (Jun. 7-12, 2015), 10 pages.

(Continued)

*Primary Examiner* — Ruiping Li
(74) *Attorney, Agent, or Firm* — Kilpatrick Townsend & Stockton LLP

(57) ABSTRACT

A computer-implemented method includes receiving first pose data for a first human represented in a first image, receiving second pose data for a second human represented in a second image, receiving first semantic segmentation data for the first image, and receiving second semantic segmentation data for the second image. A pose-aligned second image can be generated by modifying the second image based on the first pose data, the second pose data, the first semantic segmentation data, and the second semantic segmentation data. A mixed image can be determined by combining pixel values from the first image and pixel values of the pose-aligned second image according to mask data. In some embodiments, the mixed image includes a representation of an outfit that includes first clothing represented in the first image and second clothing represented in the second image.

20 Claims, 12 Drawing Sheets

(56) References Cited

OTHER PUBLICATIONS

Pathak et al., "Context Encoders: Feature Learning by Inpainting," *IEEE Conference on Computer Vision and Pattern Recognition* (Nov. 21, 2016), 12 pages.

Telea, Alexandru, "An Image Inpainting Technique Based on the Fast Marching Method," *Journal of Graphics Tools*, vol. 9, Issue 1 (2004), pp. 25-36.

Zhao et al., "Pyramid Scene Parsing Network," *IEEE Conference on Computer Vision and Pattern Recognition* (Apr. 27, 2017), 11 pages.

Zhao et al., "Pyramid Scene Parsing Network," [online]. Github.com, Apr. 24, 2017 [retrieved on Feb. 6, 2018] Retrieved from the Internet: <https://hszhao.github.io/projects/pspnet/>, 7 pages.

* cited by examiner

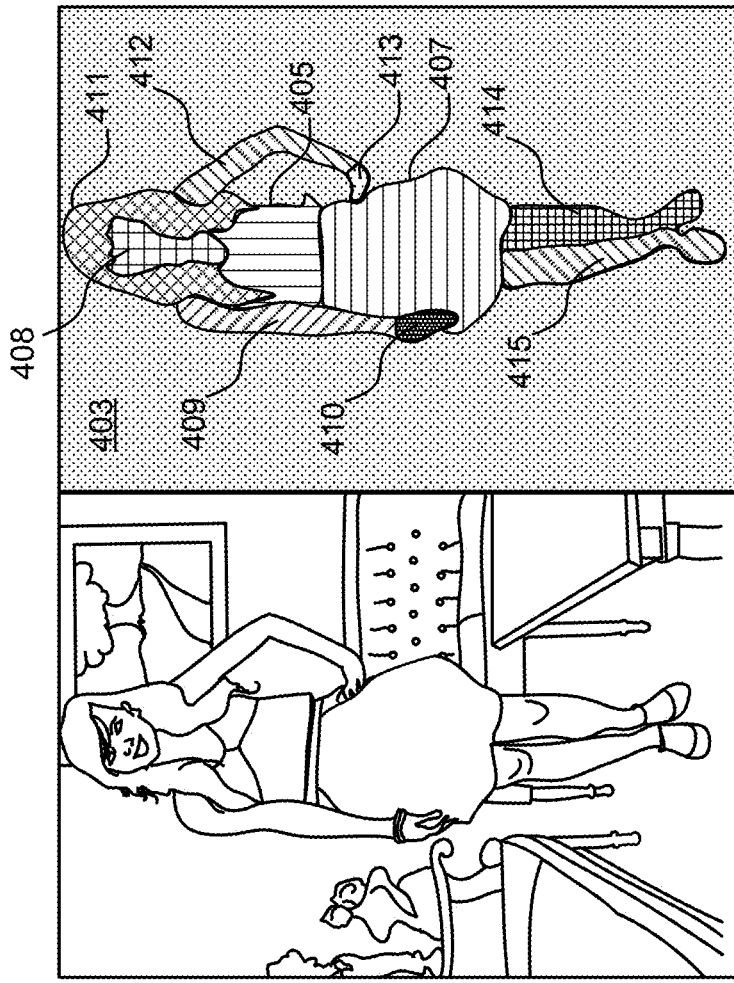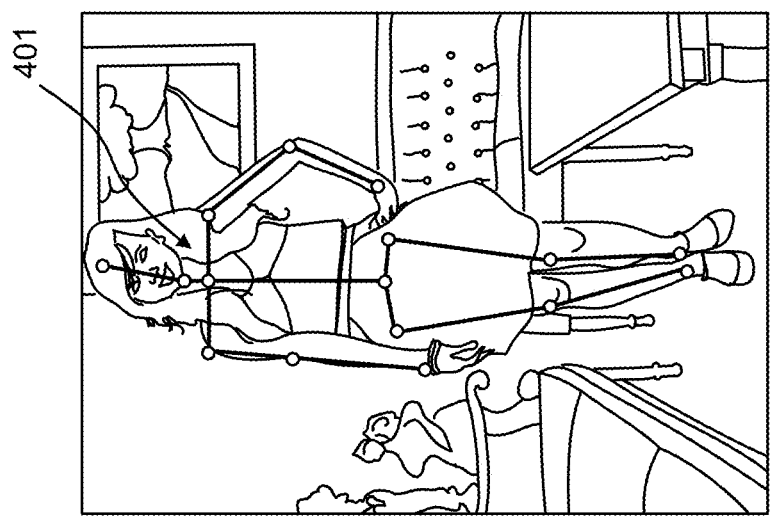

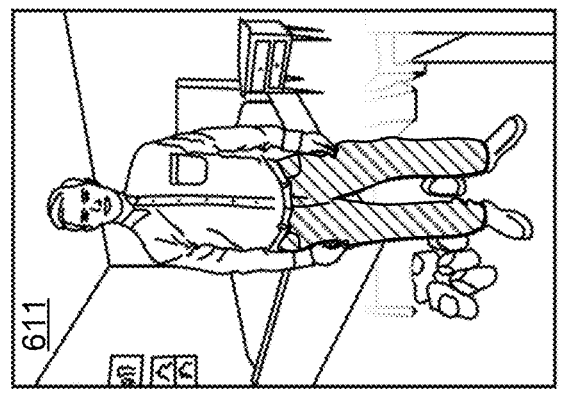
FIG. 6D
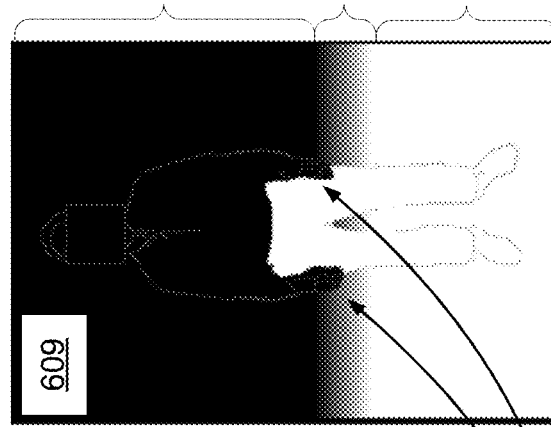
FIG. 6C
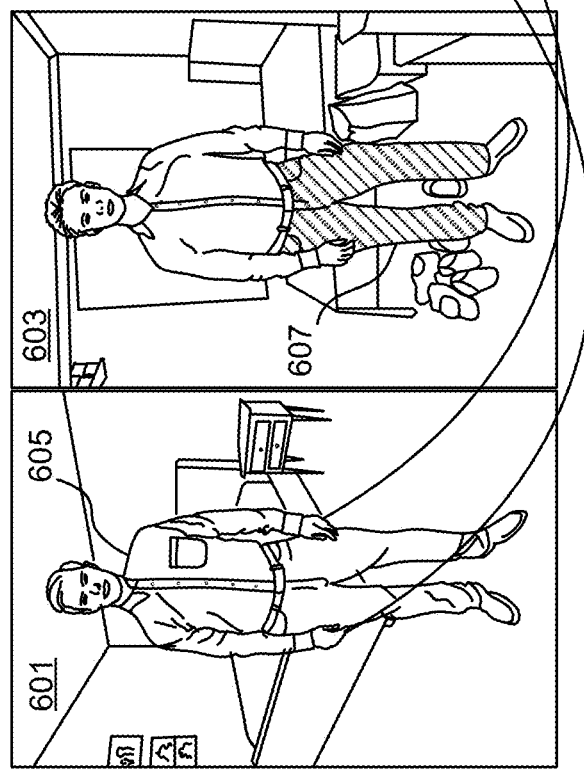
FIG. 6B
FIG. 6A

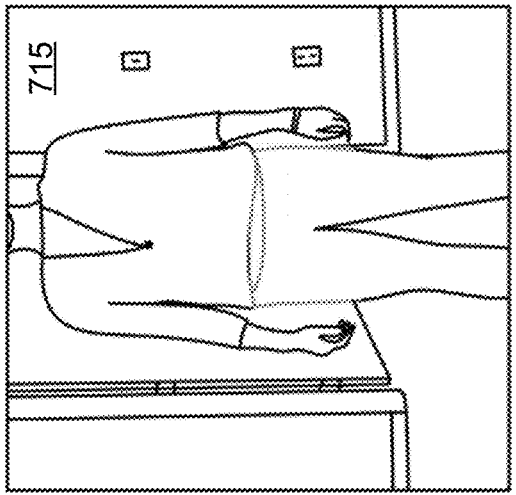
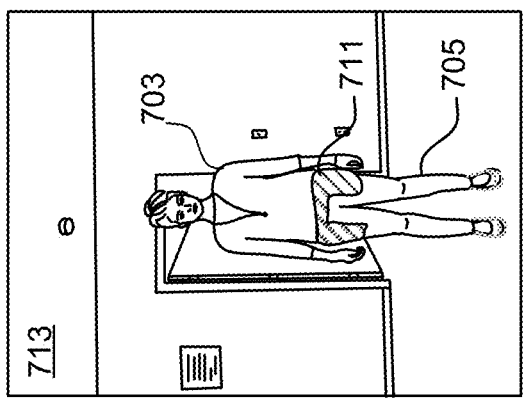
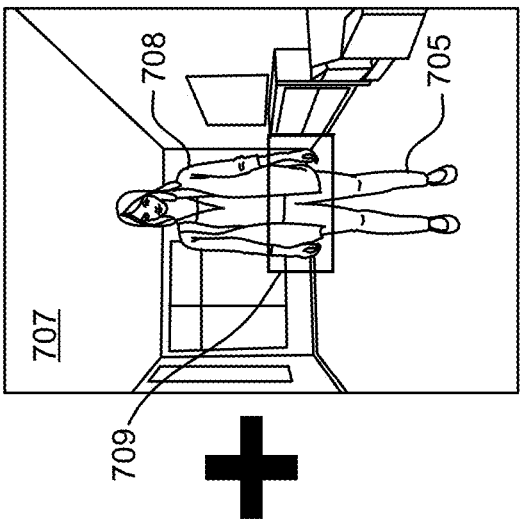
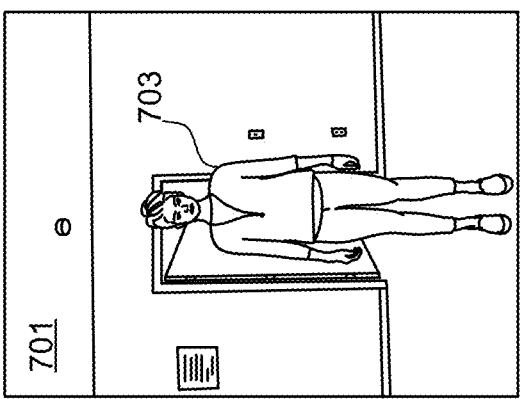
FIG. 7

METHOD AND SYSTEM FOR GENERATING COMBINED IMAGES UTILIZING IMAGE PROCESSING OF MULTIPLE IMAGES

BACKGROUND

With the advancement of technology, the use and popularity of electronic devices has increased considerably. Electronic devices are commonly used to capture and process image data.

BRIEF DESCRIPTION OF THE DRAWINGS

Various embodiments in accordance with the present disclosure will be described with reference to the drawings, in which:

FIGS. 4A-4C illustrate an image processing technique that includes pose estimation and semantic segmentation according to examples of the present disclosure.

FIG. 6A-6D illustrate an image processing technique for generating combined images utilizing image processing of multiple-images that includes a mask according to examples of the present disclosure.

FIG. 7 illustrates an inpainting processing technique according to examples of the present disclosure.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
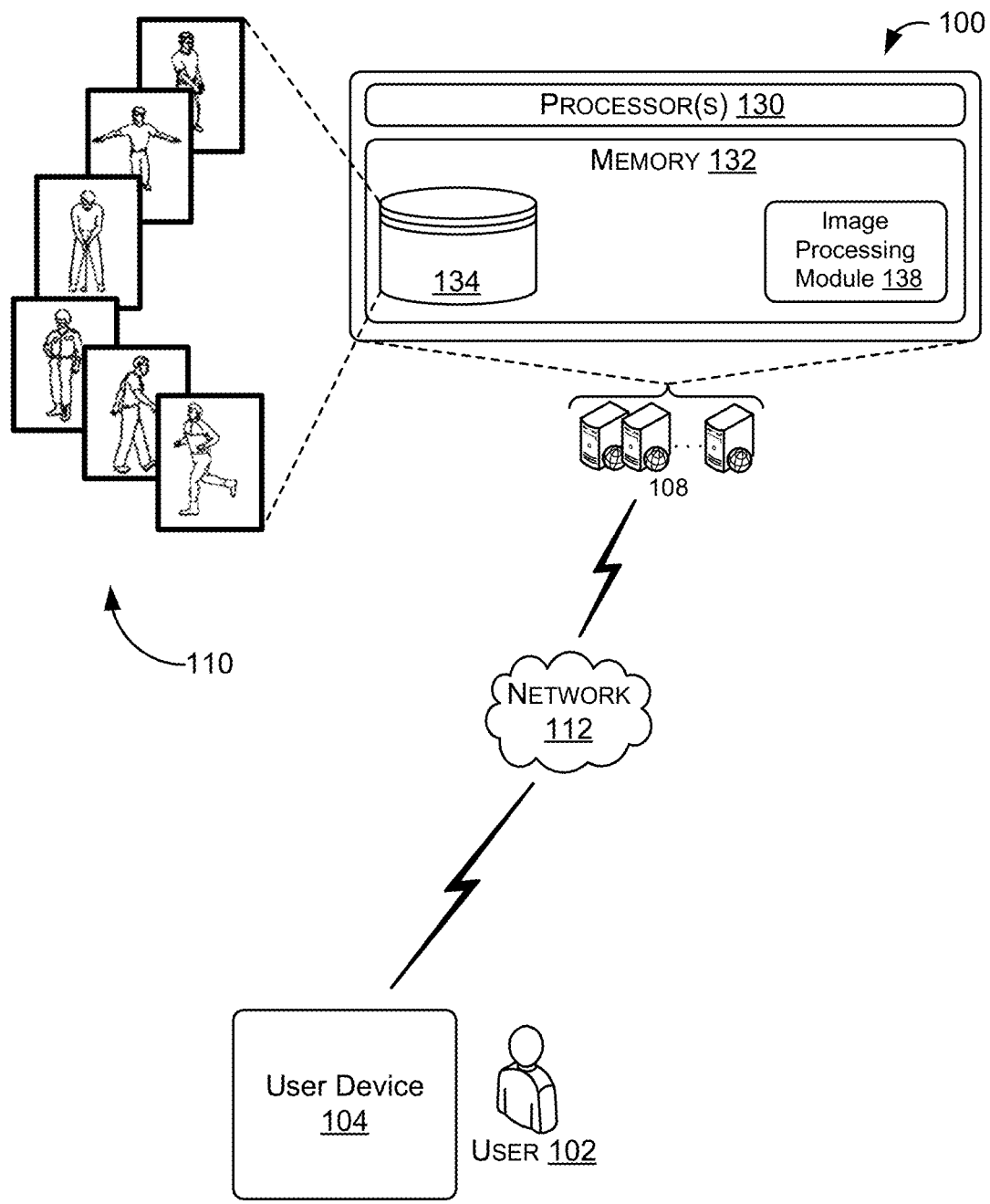
FIG. 1 illustrates a system diagram of system for generating combined images utilizing image processing of multiple-images according to examples of the present disclosure.

FIG. 1 illustrates a system 100 for generating combined images utilizing image processing of multiple-images according to certain embodiments. In this example, the system includes a user device 104, such as a smart phone, digital camera, or come other digital image capture device and a remote image processing system 108. These system components can be operatively connected to one another via a network 112, such as the internet. According to certain embodiments, the system 100 can take individual source images 110 of subjects wearing outfits and generate one or more new mixed images that are mixtures of the source images, referred to herein as "mix-and-match" functionality. Source images 110 can be digital images of one or more subjects (which may or may not be user 102) wearing different outfits. As used herein, the term "outfit" can include any combination of two or more articles of clothing, e.g., outfits can include articles of clothing such as tops (shirts, blouses, sweaters, coats, hats, etc.) and bottoms (shorts, skirts, pants, shoes, etc.). In some embodiments, the source images 110 may have been accumulated over time and could represent a user's extensive inventory of clothing, referred to herein as the user's "virtual wardrobe" and, e.g., can be stored in a data store 134 of remote image processing system 108. The remote image processing system 108 can include processors 130 that are operatively connected to memory 132, where memory 132 include computer readable instructions that when executed by the processor cause the processor to generate mixed images based on two or more source images stored in the user's virtual wardrobe. Accordingly, system 100 enables a user to quickly view representations of outfits in the various mixed images to identify new outfits, or "new looks," from the user's virtual wardrobe. For example, as shown and described further below in reference to FIG. 2, the mixed digital images generated by the system 100 can mix the top and bottom pieces of clothing from different source images 110 to provide the user with an mixed image representation of what a new outfits may look like if worn by the user.

Source images 110 can be generated by a user 102 taking one or more pictures of himself/herself using one or more electronic image capture devices, e.g., digital image capture device 104 or a camera of mobile device 116. Thus, copies of the source images 110 can be stored locally on these devices. In addition, the source images that represent the user's virtual wardrobe can be stored remotely at the remote image processing system 108 using any suitable data store 134, e.g., within an image database or the like. In addition, source images 110 can be stored in a virtual wardrobe that is remote from the image processing system 108, e.g. at the user's preferred cloud photo storage provider. Source images 110 can also be obtained from third parties via network 112. For example, source images 110 can be obtained from one or more other users via a social networking platform, via a clothing retailer website, and the like.

According to certain embodiments, the user 102 may interact with a client application running on the user device 104. For example, a graphical user interface of the user device 104 may present two or more source images to the user 102 and can allow the user 102 to select two or more source images to be used to generate a mixed image showing a new outfit. Likewise, the user device 104 may have other types of user interfaces, e.g. a touch screen or voice recognition system (not shown). In some examples after the source images are selected by the user, mixed image command data can be sent from the client application to the user device 104 to initiate the mix-and-match image processing, e.g., by an image processing module 138 that is running on the image processing system 108. In some cases, the selected images can be transmitted to the remote image processing system 108 and/or the selected images can be retrieved from the data store 134 based on one or more image identifiers within the mixed image command data. As described in more detail below, the image processing module 138 can employ a number of different image processing techniques (e.g. image transformations such as rotation, translation, and scaling) and can include one or more neural networks or other machine learning models that are trained to accomplish a number of tasks, including (e.g., clothing semantic segmentation, image pixel data generation/estimation, pose estimation, pose alignment, etc.). Once a mixed image is computed by the remote image processing system 108, the mixed image data can be sent to the user device 104 for display.

A number of additional arrangements and functionalities for the system 100 can be employed without departing from the scope of the present disclosure. For example, rather than selecting specific source images according to user input, the system can suggest a new outfit from the user's entire virtual wardrobe based on one or more machine learning models or even based on one or more preferences determined by human stylists. The suggestion process can be entirely undetermined by the user or can be partially determined by the user, e.g., the user can suggest categories of outfits (an outfit including a shirt and shorts, or an outfit including a blouse and pants) or the user could suggest particular colors or styles of clothing (evening wear, casual wear, etc.). As would be appreciated by one of ordinary skill in the art with the benefit of this disclosure, many different possibilities can be employed.

The network 112 shown in FIG. 1 may be representative of any type of communication network, including data and/or voice networks, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. In addition, the image processing system 108 may be implemented as one or more servers that, in some instances, form a portion of a network-accessible computing platform implemented as a computing infrastructure of processors and storage devices that are accessible via the network 112. As such, one or more resources of the image processing system 108 may be accessible as cloud services and the like.

Figure 11:
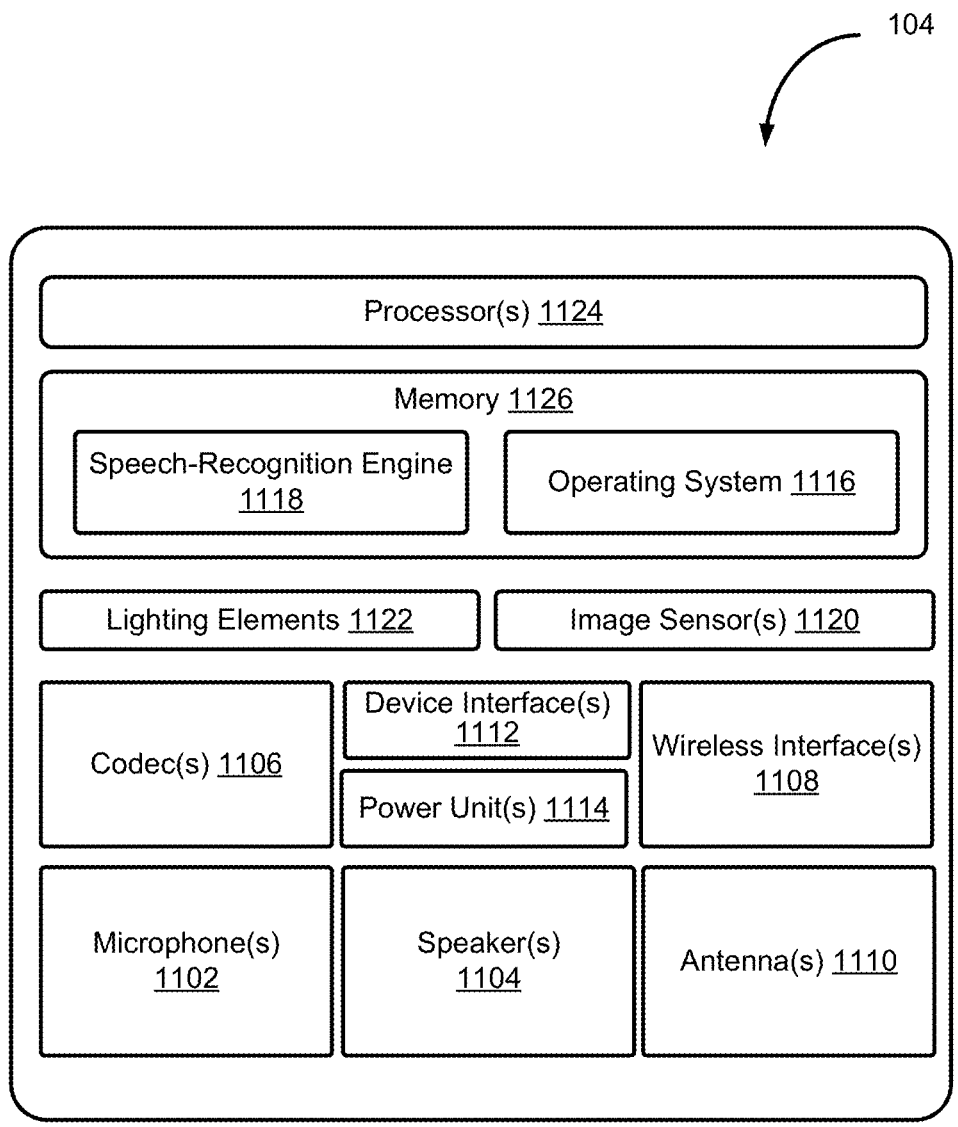
FIG. 11 is a block diagram of a user device according to examples of the present disclosure.
Figure 12:
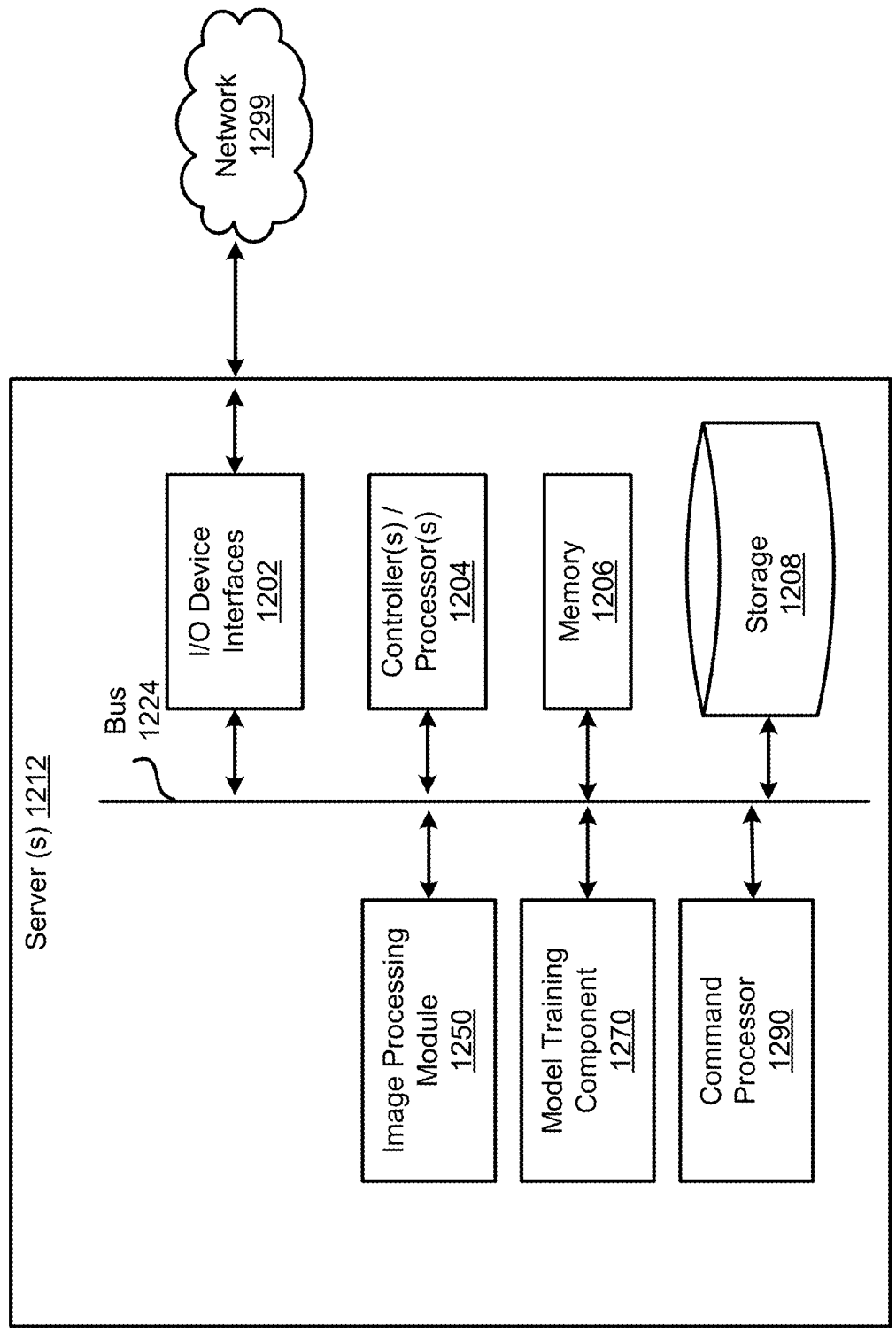
FIG. 12 is a block diagram of a server system according to examples of the present disclosure.

Furthermore, while FIG. 1 illustrates the image processing operations being performed at the image processing system 108, in some embodiments these operations may be performed wherever sufficient computational resources are provided, e.g., using the local resources (e.g., processors and memory) of the user device 104. In some embodiments, the image processing functionality may be shared between the user device 104 and the remote resources of the image processing system 108. In addition, some of or all of the image processing can be accomplished by another entity, e.g., at a third-party cloud image storage provider. In some embodiments, all or part of the functionality of the user device 104, and/or the image processing system 108 can be accomplished by a user's personal computer, e.g., a laptop, tablet, or desktop PC. FIGS. 11 and 12 below discuss additional general aspects of embodiments of the image processing system 108 and the user device 104.

As introduced above, the individual images in the data store may have been accumulated over time and could represent a user's extensive inventory of clothing, also referred to herein as a virtual wardrobe. One feature of a system is to take the individual images of outfits and generate digital images of new outfits that mix-and-match the top and bottom pieces of clothing of different images. A digital image processing capability that enables such mix-and-match functionality can allow for a user to quickly identify new outfits from an existing clothing collection.

Figure 2:
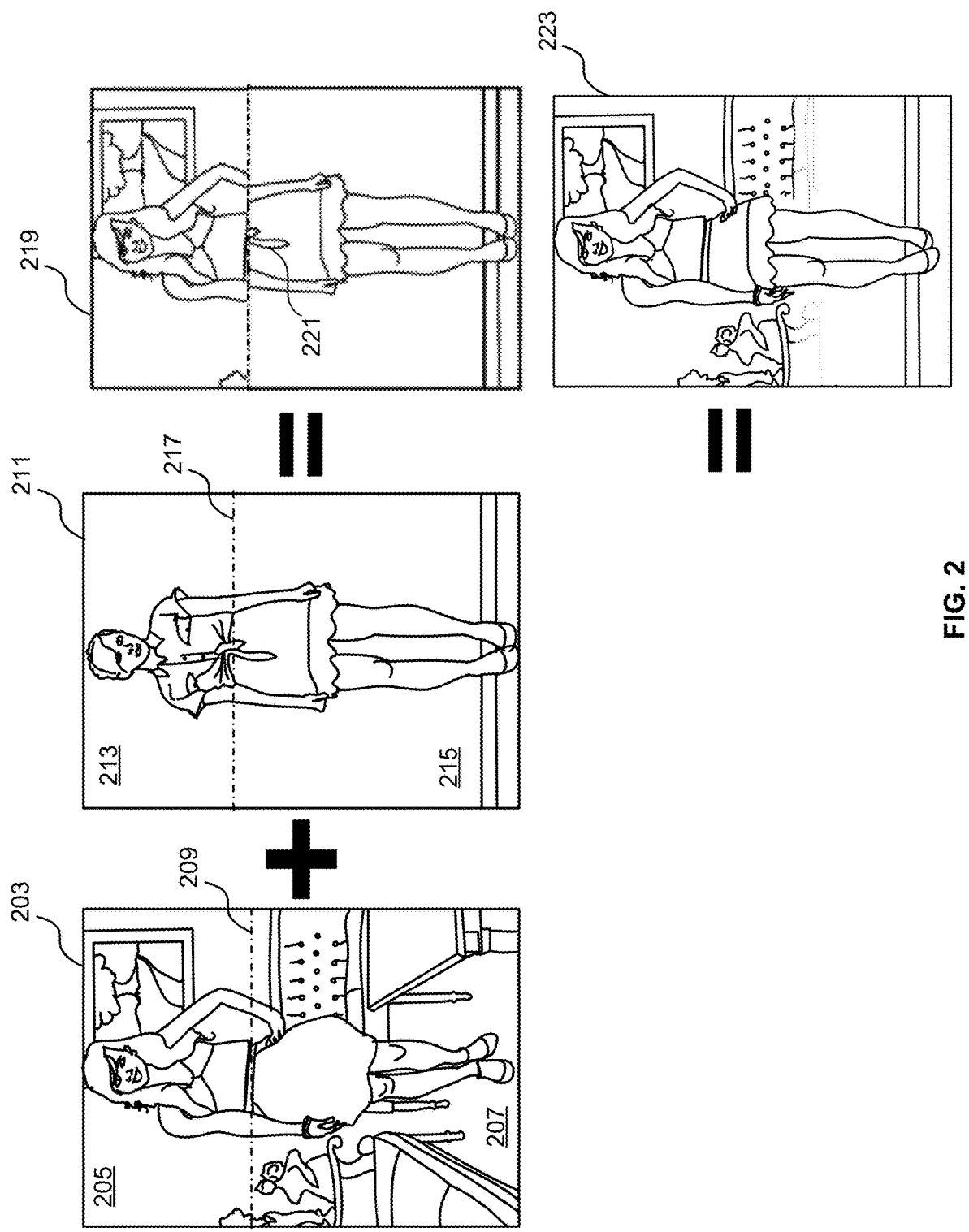
FIG. 2 illustrates a image processing technique generating combined images utilizing image processing of multiple-images according to examples of the present disclosure.

One way of implementing mix-and-match processing is to subdivide each image of an outfit into a top image portion and a bottom image portion, where the dividing line between the top image portion and the bottom image portion is determined by locating an approximate region where a top piece of clothing ends and a bottom piece of clothing begins. For example, FIG. 2 shows first image 203 of a first human subject (also referred to herein as a first human/first subject) that includes a first image top portion 205 and a first image bottom portion 207. The first image 203 can be pre-processed by the system to determine the vertical position of first image dividing line 209, e.g., by applying semantic segmentation to the image to identify the row of pixels nearest to the waist of subject in the image. The same can be done for a second image 211 of a second human subject (also referred to herein as the second human/second person/second subject) that includes a second image top portion 213 and a second image bottom portion 215 that are divided by second image dividing line 217. To accomplish the mix-and-match procedure, the processing system can then compute a mixture image 219 that includes the first image top portion 205 and the second image bottom portion.

The above-described mix-and-match processing technique suffers from a number of issues. First, if the subject in first image 203 is of a different size or scale from the subject in second image 211, the composite subject represented in mixture image 219 may be improperly aligned and improperly proportioned. In addition, the position of the arms and hands of the top subject likely will not match the position of the arms and hands of the second subject and thus, the combined image will have arms and hands that are mismatched. In addition, the backgrounds in the first and second images are also unlikely to be the same, causing the background of the mixture image to be unnatural. More subtle aspects may also degrade the quality of this combined image, e.g., one or more portions 221 of the second subject's blouse may extend into the bottom portion of the mixed image and appear as artifacts in the mixed image. Likewise, portions of the blouse and body from the first image or portions of the skirt and body of the second image may be artificially removed from the mixture image, leading to key pieces of the clothing being missing from the mixture image, in addition to key portions of the mixture subject's body being highly distorted, such as the subject's waist.

To address the shortcomings described above, embodiments of the present disclosure provide an image processing system that leverages artificial intelligence and other advanced machine learning-based image processing techniques to produce an improved mixture image 223. As will be described in further detail below in reference to the remaining figures, the improved mixture image can include the clothing top, upper torso, and arms of the subject represented in the first image combined with the clothing bottom and lower torso of the subject represented in the second image. In addition, where appropriate, a pose alignment technique can also be applied to the subject in the second image to ensure that the scale and position of the body of the subject in the second image matches the scale and pose of the subject in the first image. In addition, where appropriate, a background blending technique can be applied that gradually transitions the first picture background into the second picture background so as to provide a blended background in the mixed image that appears more realistic to a user. In addition, where appropriate, the image processing method disclosed herein can include an inpainting procedure where one or more empty/undefined regions of the mixture image are filled.

Figure 3:
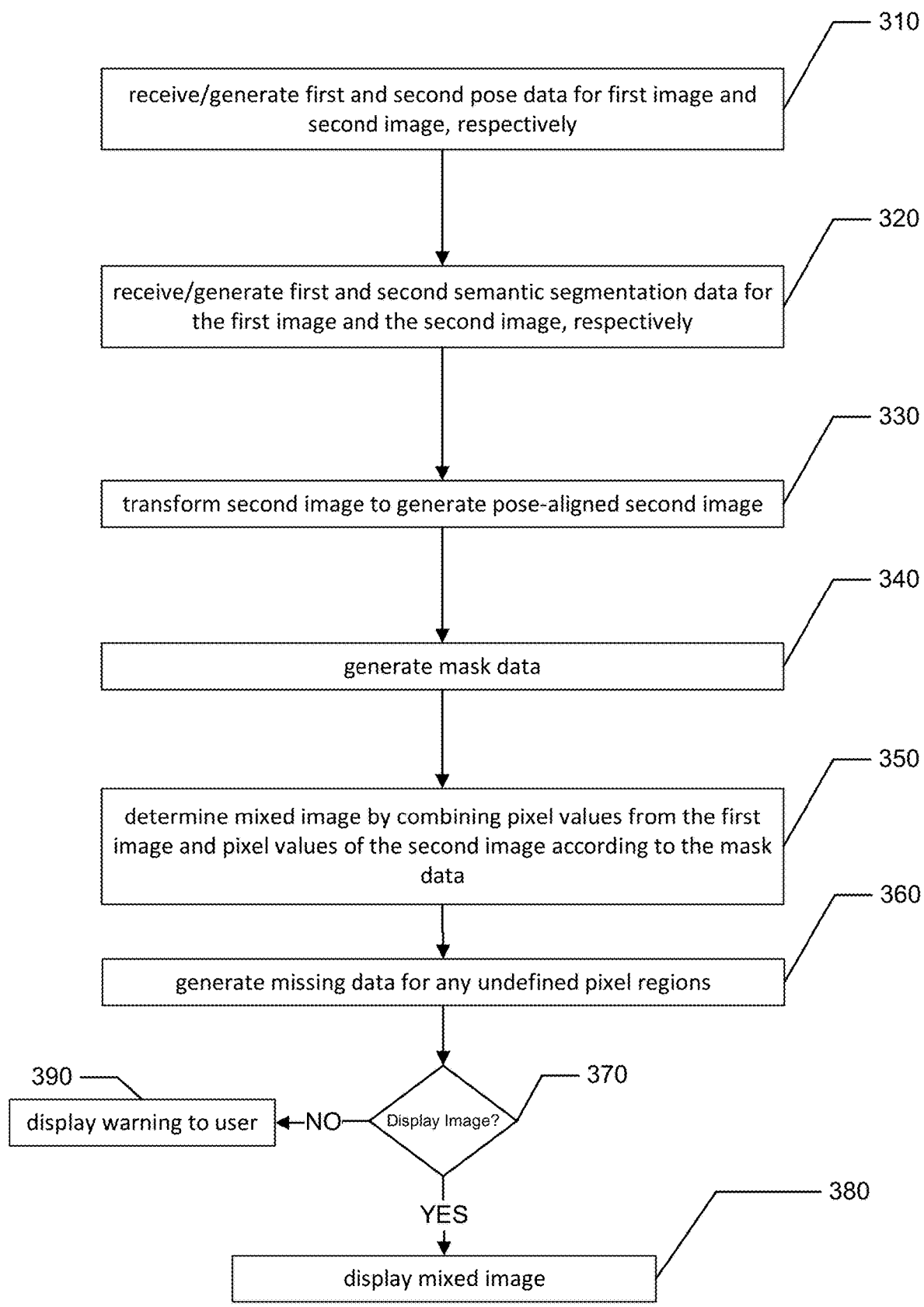
FIG. 3 is a flowchart conceptually illustrating generating combined images utilizing image processing of multiple-images according to examples of the present disclosure.

FIG. 3 is a flowchart conceptually illustrating a mix-and-match image processing technique according to examples of the present disclosure. The mix-and-match image processing technique can be implemented by a mix-and-match image processing system that includes one or more processors that are operatively connected to a computer storage medium that includes a library of stored images. For example, in some embodiments, the mix-and-match image processing described below can be accomplished by the image processing module 138 described above in reference to FIG. 1. In some embodiments, the image processing module take the form of software and/or hardware components on a remote server system, such as that described below in FIG. 12, or on a user device, such as the device described in FIG. 11 below. In some embodiments, the components of the image processing module can be shared across both a server system and a user device.

In some embodiments, in response to user input that selects a first image and a second image, the mix-and-match image processing system can present a mixed image to a user via a display. The mixed image includes a representation of a mixed subject that appears to wear a top piece of clothing from the first image and a bottom piece of clothing from the second image.

In step 310, the system receives and/or generates first and second pose data from a first image and a second image, respectively. The first and second image can include first and second image data in the form of pixels, e.g., arrays of RGB values and the like, and the first and second images can be chosen in advance by a user, e.g., via touch selection on a touch screen or some other form of UI device such as a mouse, keyboard, voice recognition system, etc. For simplicity, the term "RGB image" or "color image" is used herein to describe images that include any color space that can be used to generate an image, including greyscale. Accordingly, any reference herein to the acronym "RGB" is not intended to limit embodiments to images that employ only Red, Green, and Blue as the color space. Unless explicitly noted, the terms "image" and "image data" will be used synonymously herein.

FIG. 4A shows an example of pose data that can be used by the image processing system. In particular, the pose data specifies an estimate of the orientation of a subject's head, arms, torso, legs, etc. In one example, pose data can include localization data that determines the location in the image of one or more joints of the subject, e.g., neck joint, elbow joints, shoulder joints, hip joints, knee joints, etc. The location of the joints can then be used to infer the position of various body parts. The overall pose data can include a digital representation of the subject of the image as a stick figure, such as stick figure 401 shown in FIG. 4A. If pose data is not already available, any type of processing technique can be used to estimate the pose from the image data. For example, a machine learning model such as a stacked hourglass Caffe model can be used or any other model for estimating pose may be used without departing from the scope of the present disclosure. In addition, the landmarks/reference points for pose estimation can be joints, or other points of reference such as nose, ears, hands, knees, feet, or any other part of the body. Furthermore the mix-and match image process need not perform pose estimation at all but instead can receive pre-processed image data that already includes pose data. Such data can be provided by another processing module operating outside the system or can even be performed in advance by human annotators.

In step 320, the system generates and/or receives first and second semantic segmentation data for the first image data and for the second image data, respectively. As used herein, the process of semantic segmentation refers to an image processing technique by which pixels of an image are segmented into different categories or labels. For example, a semantic segmentation of an image can result in the pixels of the image being categorized as top clothing pixels (such as shirt pixels and coat pixels) and/or bottom clothing pixels (such as skirt pixels and pants pixels). Pixels associated with clothing accessories can also be categorized by the semantic segmentation. For example, pixels of the image can be categorized as scarf pixels, hat pixels, and/or shoe pixels. Pixels can also include unclothed aspects of the subject, e.g., pixels can be categorized as head pixels, leg pixels, feet pixels, arm pixels, hand pixels, etc. Other categories can include any pixel not falling onto a clothing/body/accessory category, that in some cases can be referred to as background pixels (i.e., any pixel that is not part of the subject's body or clothing can be segmented into the background category). In some embodiments, the term "categorized as" (as it relates to the semantic segmentation data) includes a process by which a set of values that identify the category of each pixel in an image are associated with each pixel, or a subset of pixels, in the image. For example, a semantic segmentation process (e.g., based on a machine learning model or even human inspection and tagging of pixels in the image) can identify pixel locations of various semantic categories of objects in the image. Accordingly, semantic segmentation data can take the form of a semantic segmentation image (e.g., like that shown in FIG. 4C) having pixel values that correspond to the category identification of the underlying pixels, e.g., 'head_pixels'=1, 'left_arm_pixels'=2, 'right_arm_pixels'=3, 'shirt_pixels'=4, 'pants_pixels'=5, 'background_pixels'=6 and so on. One of ordinary skill would appreciate that any mapping between categories and pixel values are possible, even non-numeric pixel values, without departing from the scope of the present disclosure. Semantic segmentation data can also take the form of labels, tags, or any other form of metadata that can be associated with the pixels of an image using any appropriate data structure in which case, the semantic segmentation data need not take the form of a semantic segmentation image data structure that is distinct from the image itself, but rather may take the form of metadata that is associated with the pixels making up the original image.

If semantic segmentations of the source images are not already available, the image processing system can perform a semantic segmentation of the images using any type of processing technique that can be used to perform the semantic segmentation. For example, a machine learning model, such as a fully convolutional neural network (FCN) Caffe model that is trained for human part semantic segmentation can be used. For example, in one implementation for training the FCN model, both RGB and pose data can be used. In such a case, at the input of the network RBG data is included and additional layers are used (e.g., 16 layers) with each layer having a Gaussian signal around one pose joint, e.g., around the right ankle. Such an implementation can give additional global information to the neural network thereby resulting in an improved segmentation of the images as compared to a bare FCN model. Other models can be employed as well, e.g., a pyramid scene parsing network (PSPNet) can be employed. The PSPNet is an extension of a traditional dilated FCN where the pixel-level features of the FCN are extended to the specially designed global pyramid pooling module. In the PSPNet, the local and global clues together make the final prediction more reliable. In some embodiments, any other model for performing semantic segmentation can be used without departing from the scope of the present disclosure. In some embodiments, the system need not perform semantic segmentation at all but instead can ingest pre-processed data that already include semantic clothes segmentation data. Such data can be provided by another processing module operating outside the system or can even be performed in advance by human annotators.

FIG. 4C shows the results of a semantic segmentation of the image shown in FIG. 4B. As noted above, the semantic segmentation can be computed by the image processing system or the pre-segmented image can be received, e.g., downloaded, from some other source. In this example, background pixels 403 are provided with a dotted fill. Pixels associated with the subject's blouse are categorized as top clothing pixels 405 and shown with vertical parallel line hatching. Pixels associated with the subject's skirt are categorized as bottom clothing pixels 407 and shown with horizontal parallel line hatching. Pixels associated with the subject's exposed body parts are also categorized by the segmentation, e.g., head pixels 408, hair pixels 411, left arm pixels 412, left hand pixels 413, right arm pixels 409, right hand pixels 410, left leg pixels 414, and right leg pixels 415. One of ordinary skill will appreciate that any number of categories can be employed for the semantic segmentation that are more specific or less specific than that shown in FIG. 4C. For example, left leg pixels 414 and right leg pixels 415 can be further segmented into leg and feet pixels or leg and shoe pixels.

In some examples, the pose data and clothing segmentation data is generated for each image stored in the computer storage medium and then separate, but corresponding, pose estimation images and clothing segmentation images can also be stored in the computer storage medium. The various computations to generate the pose data and clothing segmentation data can be done local to a mix-and-match image processing system that also includes a camera for acquiring one or more images of a subject and/or can be performed remotely from the system that acquires the image, e.g., as part of a cloud-hosted service.

In step 330, the second image data is transformed to generate pose-aligned second image data. For example, a size scaling, rotation, and/or a translation transformation can be applied to the second image data to best match the pose of the subject represented in first image data.

In some embodiments, a scaling transformation to be applied to one of the images can be determined based on a comparison of the subjects' heights in each image using the clothing segmentation data. For example, the height of the subject represented in the first image can be determined by computing a distance between one or more pixels representing the first subject's head and one or more pixels representing the first subject's feet. Likewise, the height of the subject represented in the second image (referred to herein as the second subject) can be determined by computing a distance between one or more head pixels and one or more feet pixels of the second subject. In some embodiment, the location of the one or more feet and head pixels can be determined based on the sematic segmentation data, as described above in reference to step 320. The actual distance metric used for the height calculations can vary without departing from the scope of the present disclosure. For example, first the highest head pixel can be found, i.e., the head pixel having the largest x-coordinate value can be found from the group of head pixels. Likewise, the lowest foot pixel can be found, i.e., the foot pixel having the smallest x-coordinate value can be found from the group of feet pixels. Then, to find the height, a difference between the x-coordinate of the highest head pixel and the lowest foot pixel can be computed. Other methods can be used as well. For example, the average x-coordinate of the head can be found by taking the mean value of all the x-coordinates of the set of head pixels. In other examples, a minimum value can be used or even a centroid. In yet other examples, additional semantic segmentation data may be used (e.g., the position of one or more eye pixels or nose pixels can be used) or pose data can be used (e.g., the position of a neck joint, a hip joint, knee joint, or ankle joint can be used). Based on the computed height data, a scaling transformation can be determined that when applied to the second image, can scale the height of the second subject such that the scaled height is substantially equal to the height of the first subject.

Other method of scaling the two images can also be employed without departing from the scope of the present disclosure. For example, instead of taking the head-to-feet height as the length for comparison, other measures may be used. For example length from waist to head, hands to head, waist to feet, etc., can be used without departing from the scope of the present disclosure. In addition, semantic segmentation images and pose data can be used to locate the subjects and the various points of reference to compute the scale factors used to scale one RBG image to match the height of the subject represented in the other RGB image.

In some embodiments, a rotation and/or a translation transformation can also be applied to the second image to generate the pose-aligned second image. For example, the pose data can be used to optimize the rotation/translation by minimizing the distance between the pose joints or any other suitable features in the image. In some embodiments, the cost function can employ multiple weights for different features/pose joints. In one example, the alignment of the hip joints are favored in the cost function such that the rotation/translation transform of the image will tend to align the hip joints of the two subjects represented in the first and second images. In some embodiments, the pose data can be used to determine a lean direction of the subjects represented in the images and to apply a left/right mirror transformation (e.g., x→−x) to align the images, e.g., to align a left-to right-leaning torso from the first image with an originally right-to-left leaning set of legs from the second image.

In some examples, a translation and/or a rotation of the image can result in part of the image background having undefined pixels. For example, if the second image is translated leftward by 20% then the rightmost 20% of the transformed pixels will be undefined. Any type of pixel estimation method can be employed to estimate the missing pixels, e.g., the last row of pixels can be smeared rightward to fill the remainder of the image or more advanced context aware techniques can be used. In other examples, the subject in the image can be completely cropped out and any artificial background can be added, including various artistic effects and/or other geographic backgrounds that can be chosen by the user.

Figure 5C:
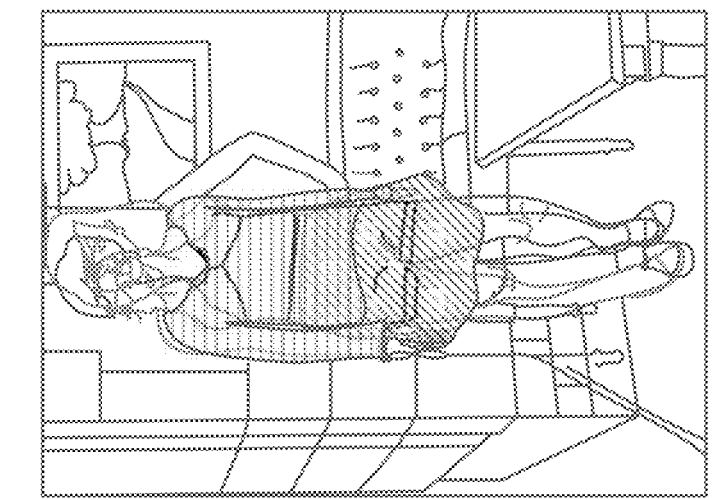
FIG. 5A-5C illustrate an image processing technique that includes pose alignment according to examples of the present disclosure.
Figure 5B:
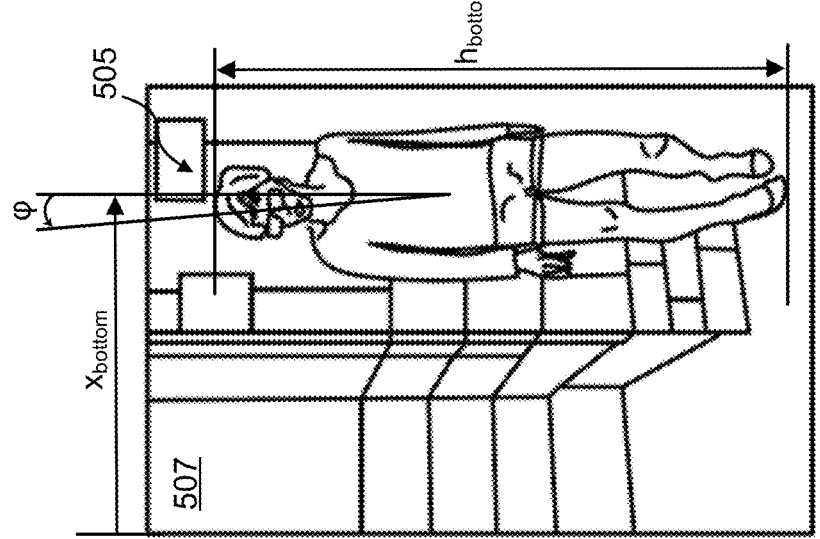
Figure 5A:
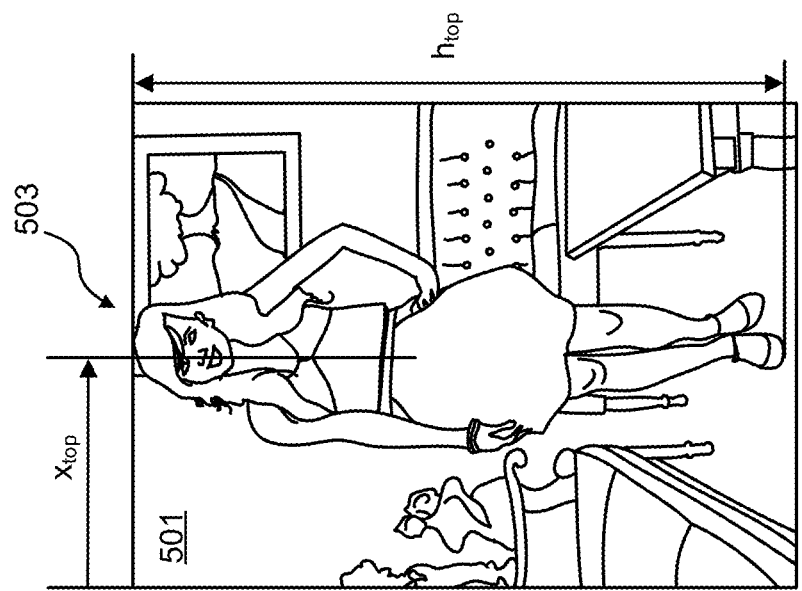

FIGS. 5A-5C show an example of a first image 501 that includes a first subject 503 that whose height $h_{top}$ is larger than the height $h_{bottom}$ of a second subject 505 in second image 507. The actual subjects need not be taller/shorter than each other in real life, but rather, the effect can be caused by external factors such as distance to the camera and/or magnification of the lens system being used to take the image, or even because the images are stored with differing resolutions. In this example, the scale factor α for scaling the second image can be determined by $\alpha = h_{top}/h_{bottom}$ where $h_{top}$ and $h_{bottom}$ can be measured in pixels using, e.g., reference points determined from the respective semantic segmentation image.

In addition, the relative position of first subject 503 within the frame of the first image 501 can be different from the relative position of the second subject 505 within the frame of the second image 507. Accordingly, the pose alignment processing can include a registration step that can translate (in x and/or y) one subject relative to the other subject. In the example shown in FIG. 5A, x-position of the first subject is indicated by $x_{top}$ and the x-position of the second subject is indicated by $x_{bottom}$ and thus, a translation may be performed to register the two subjects in their respective images before created a mixed image. In some embodiments, $x_{top}$ and $x_{bottom}$ are relative positions measured as a fraction of the total width of the image, e.g., $x_{top}$ approximately equal to 0.50 and $x_{bottom}$ being closer to 0.75 as in the example illustrated in FIGS. 5A-5B. In some embodiments, the translation transformation can be affected by cropping the image or by translating the image.

The pose alignment processing can also include a rotation transformation to bring the overall alignment of the body of subject 505 into alignment with the body of subject 503. For example, while subject 503 appears to be standing vertically upright, subject 505 appears to be leaning on a wall and thus the subject's body may be slightly tilted at an angle (p relative to vertical. In order to bring the two subjects into better alignment, second image 507 can be rotated by cp.

FIG. 5C shows an overlay of the first image 501 and the pose-aligned second image, i.e., the scaled, translated, and rotated second image 507. It can be seen that the overall pose match between the two subjects is improved, which leads to an improved mixed image as described in further detail below. While the description above focused on scaling, translating, and rotating the second image 507 relative to the first image 501, other pose alignment techniques can be employed without departing from the scope of the present disclosure. For example, the first image can be transformed such that the first subject is transformed to match the pose of the second subject. In some embodiments, the system can choose which subject/image to transform based on a characteristic of one of the images, e.g., based on the comparative heights of the two subjects. For example, the system can choose to scale up the shorter subject to match the taller subject or to scale down the taller subject to match the shorter subject.

In step 340, mask data (e.g., in the form of mask pixels) is generated by the system. At its most general, the mask defines a set of rules/conditions to determine how the pixels of the first image should be combined with the pixels of the second image (or, equivalently, with the pose-aligned second image, if pose alignment is necessary) to generate the mixed image. In one embodiment, the mask can be defined as a pixel-by-pixel mixing rule that defines the value that a mixed image pixel $P_{i,j}^m$ should take given the values of a pixel $P_{i,j}^1$ of the first image and a corresponding pixel $P_{i,j}^2$ from the second image or pose aligned second image. In this example, the mask data includes as a set of numbers, referred to herein as mixing coefficients, $0 \leq \beta_{i,j} \leq 1$, such that a mixed image pixel is defined by the following mixing condition:

$$P_{i,j}^m = \beta_{i,j} P_{i,j}^1 + (1 - \beta_{i,j}) P_{i,j}^2. \quad (1)$$

Thus, if the mask data for a pixel i,j has $\beta_{i,j}=0$, then the value for the mixed image pixel i,j will be equal to the value of the pixel i,j from the second image. Likewise, if the mask data for a pixel k,l has $\beta_{k,l}=1$, then the value of the mixed image pixel k,l will be equal to the value of the pixel k,l from the first image. Values of the mixing coefficients that take values between 0 and 1 will generate mixed image pixel values that are linear combinations of the pixel values from the first and the second image. Eqn. (1) can be applied to a monochromatic pixel or can be applied separately to each constituent color for a color image. While Eqn. (1) describes a linear combination, other combinations can be employed without departing from the scope of the present disclosure. Furthermore, different colors from corresponding pixels need not be combined in the same way and thus, Eqn. (1) should serve only as one example and one of ordinary skill in the art with the benefit of this disclosure could implement many other forms.

In some embodiments, the value of $\beta_{i,j}$ can be determined based on the semantic segmentation images (first and second) as follows. Using data from the first clothing semantic segmentation image, pixels that are associated with the head, hands, and top piece of clothing of the first subject are assigned a first value, e.g., $\beta_{k,l}=1$, indicating that these pixels in the mixed image correspond to pixels of the first image only. Likewise, using data from the second semantic image, pixels that are associated with the feet and bottom piece of clothing are assigned a second value, e.g., $\beta_{k,l}=0$, indicating that these pixels in the mixed image correspond to pixels of the second image only. In addition, embodiments can employ a background blending technique whereby in a background blending region of the mask, $0 < \beta_{k,l} < 1$, and thus, the background pixels values of the mixed image in the background blending region can be linear combinations of background pixel values in the first and second image. Blending backgrounds in this way ensures that, in the background blending region, the pixels of the mixed image include contributions from both the first image and the second image. Such a mask can produce an effect where the top portion of the first image background gradually fades into the bottom portion of the second image background thereby reducing the visibility of mismatches between the two backgrounds in the final mixed image, as shown and described further in reference to in FIGS. 6C-6D below.

FIGS. 6A-6D illustrate the effect of applying the mask according to certain embodiments. FIG. 6A shows a first image 601 and FIG. 6B shows a second image 603. In this example, a user may wish to have the system generate a mixed image that includes a shirt 605 from the first image 601 and pants 607 from the second image 603. FIG. 6C shows the mask data 609, whose pixels values define how the pixels of the first image should be combined with the pixels of the second image to generate the mixed image, shown in FIG. 6D. In the mask data 609 shown in FIG. 6C, a black pixel represents $\beta_{k,l}=1$ (pixels sourced from first image only) and a white pixel represents $\beta_{k,l}=0$ (pixels sourced from second image only). For the sake of illustration, FIG. 6C also includes a light outline of the relevant portions of the subject from the first and second images (i.e., this outline need not be part of the mask data). As can be seen from FIG. 6C, the shape of the curve that divides the subject of the mixed image between pixels to be used from the first image and pixels to be used from the second image has a non-trivial shape that is determined by the first semantic segmentation data (as opposed to being a simple horizontal line, as discussed above in reference to FIG. 1). More specifically, the head, shirt, arms, and hands are chosen from the first subject using the pixel categorization from the first semantic segmentation data and the pants and shoes are chosen from the pixel categorization from the second semantic segmentation data.

To generate the background of the mixed image, the system uses the semantic segmentation data of the first and second images to determine which pixels are background pixels. These background pixels are then blended together according to the mask to form the background of the mixed image. According to the mask data shown in FIG. 6C, the top background region 613 is sourced from only the background pixels of the first image ($\beta_{k,l}=1$) and the bottom background region 617 is sourced from only the background pixels of the second image ($\beta_{k,l}=0$). The background blending region 615 is a region where the pixel values of the mixed image background are mixtures of the first and second image ($0<\beta_{k,l}<1$). The background blending region 615 has a predetermined height and has a blending width that extends across a width of the mixed imaged. The value of the mixing coefficient $\beta_{k,l}$ in the mixing region can vary based on the vertical position in the mixture image, e.g., $\beta_{k,l}$ can vary from 0 to 1 according to some functional form such as a cubic, sigmoid, logistic function, or any other monotonically increasing/decreasing function. According to certain embodiments, the location of the center of blending region 615 can be determined based on the first semantic segmentation data. For example, the center of the blending region 615 can be located at, or a fixed distance below (e.g., 5 pixels, 10 pixels below, etc.), the hands of the first subject, as shown in FIG. 6C. In the blending region 615, the action of the mask is to cause the first and second image backgrounds to gradually blend into one another, an example of which is shown in the mixed image of FIG. 6D.

While the blending region shown in FIG. 6C is linear, any shape can be employed without departing from the scope of the present disclosure. For example, the blending region can be curved or can be determined by an algorithm that can detect features or edges in the images, e.g., based on edges that are detected in the background of the image (e.g. via a seam carving algorithm and the like).

In step 350, the mixed image 611 is determined by combining pixel values from the first image and pixel values of the pose-aligned second image (or the raw second image) according to the mask data. In some embodiments, the application of the mask includes the computation of a set of mixed image pixels corresponding to a computation of Eqn. (1) over the set of all first and second image pixels. As would be appreciated by one of ordinary skill in the art with the benefit of this disclosure, many different methods can be employed to apply the mask other than the two examples disclosed above.

In some cases, in one of the images, a portion of an upper piece of clothing, e.g., a long coat, overlaps with a portion of a bottom piece of clothing, e.g., a skirt. Such as case is shown in FIG. 7, where in the second image 707, the coat 708 overlaps with a portion of the pants 705. Thus, the pixels values in the overlap region 711 of the mixed image 713 are undefined. To provide a more realistic image in this case, embodiments employ a processing technique by which the missing pixel values of the mixed image can be generated via a pixel estimation process, a process referred to herein as "inpainting." Accordingly, in step 360, an inpainting process can be applied to the mixed image to generate estimated pixel values for any pixels in the undefined pixel regions. Such regions can exist both in the mixed image and in any mixed semantic segmentation images that are generated during the processing. Additional details regarding the various techniques that can be employed to perform pixel estimation as part of the inpainting process are described below in reference to FIGS. 7-10.

In some cases, it could be that the first image and the second image chosen by the user cannot be mixed in any sort of realistic manner. For example, poorly matched images can include unrealistic body features and shapes and/or a relatively large region of undefined pixels in the mixed image that cannot be accurately inpainted to produce a realistic mixed image. According to certain embodiments, in step 370, the mixed image can be run through an image discriminator in order to test its suitability for display. The image discriminator can be designed any number of ways without departing from the scope of the present disclosure. For example, a support vector machine (SVM) classifier can be used that is trained on a number of heuristic features, e.g., inpainted region size, pose score, segmentation score, etc. In other embodiments, a deep neural network (DNN) classifier can be employed. Regardless of the form of the discriminator, if the discriminator determines that the image should be displayed, the system will proceed to step 380 and the mixed image is displayed to the user. If the mixed image fails the discriminator's test, the system will proceed to step 390 and can display an indication to the user (a message, icon, or the like) that indicates to the user that the images cannot be mixed. In some embodiments, the discriminator can be trained to differentiate between real images and inpainted images. For example the discriminator can take an image as input and output an image quality score that represents the discriminator's estimate of whether or not the image is an inpainted image or a real image. The quality score can take any form and could be, e.g., a binary score or a numerical score between 0 and 1. Based on the value of the quality score the discriminator can determine whether or not to display the mixed image to the user. For example, the discriminator can compare the quality score to a threshold value and if the quality score is larger than the threshold value, the system will display ithe mixed image to the user.

FIGS. 7-10 are provided to further aid in the description of the process of inpainting, as introduced above in reference to step 360 of FIG. 3. FIG. 7 shows a mix-and-match scenario that could require inpainting (i.e., pixel value estimation) to produce a realistic mixed image. In this example, a user may want to generate a mixed image 713 having a subject wearing a shirt 703 from first image 701 and pants 705 from second image 707. As can be seen in second image 707, there are portions of pants 705 that are obscured by the coat 708. Accordingly, there are some pixels in the second image 707 that should be associated with the pants in the waist/upper leg region 709 but instead are associated with the coat 708. This issue leads to an undefined pixel region 711 being present in the mixed image 713. More explicitly, the undefined pixel region 711 exists in the mixed image 713 because after applying the mask, only the second image pixels that are categorized as "pants pixels" by the semantic segmentation will be selected by the mask. However, in the undefined pixel region 711 there are no pants pixels only coat pixels, and thus the application of the mask will result in no data being chosen from either the first or the second image. Consequently, the RGB values for the pixels in this region 711 are completely undefined—there is simply no data for these pixels. One possible option for solving this issue is to assign a default value to the pixels in the undefined pixel region but such a naïve approach can lead to a visible hole-like artifact being present in the mixed image 713. Advantageously, one or more embodiments of the present disclosure can generate realistic new data for pixels in the undefined pixel region (e.g., by using one or more neural networks to estimate the RGB values of the pixels in the undefined pixel region 711).

According to certain embodiments, a process referred to herein as "deep inpainting" can be used to generate the missing data used to inpaint the mixed image. While the process of deep inpainting is described herein, according to certain embodiments, any type of inpainting and/or pixel value estimation process can be employed, and some techniques can employ machine learning models and neural networks but some may not. Examples of inpainting methods include the Telea method, the patch match method, and the like. As will be described further in reference to FIG. 10 the deep inpainting process includes two neural networks: one network, referred to herein as the semantic segmentation filling network, for generating inpainted semantic segmentation images, and one network, referred to herein as the RGB inpainting network, that that generates inpainted RGB images. The semantic segmentation filling network takes as input a semantic segmentation image of the mixed image, e.g., made by combining the semantic segmentation images of the first and second images according to the mask. This mixed semantic segmentation image can have undefined regions as described above in reference to the RGB images. The job of the semantic segmentation filling network is to generate the missing data for the undefined regions in the mixed semantic segmentation image to generate an inpainted mixed semantic segmentation image. The RGB inpainting network then takes as input the inpainted mixed semantic segmentation image to help improve the inpainting process. For example, the pixels of the inpainted mixed semantic segmentation image can be provided to the RGB inpainting network as hints that can inform the network of the semantic category of pixel data that should be applied to the undefined pixel region. In some embodiments, the two neural networks can be combined into one neural network that takes as input mixed semantic segmentation images and mixed RGB images (both possibly having one or more undefined pixel regions) and outputs inpainted semantic segmentation images and/or inpainted RGB images.

Training of the inpainting neural networks proceed in several stages. In one example, both the semantic segmentation inpainting neural network and the RGB inpainting neural network can be trained using image discriminators, which themselves can be neural networks. In this example, the image discriminator neural networks are trained to produce an image quality score that represents the network's estimate of how likely it is that the inpainted image is a real image and these discriminators are trained in advance using a training set of real images and inpainted images. Then these trained discriminators are used to train both the semantic segmentation inpainting neural network and the RGB inpainting neural network as described below in reference to FIGS. 8-9. In some embodiments, the discriminator neural networks can employ a generative adversarial network (GAN) architecture or any other suitable architecture for a discriminator system.

Figure 8:
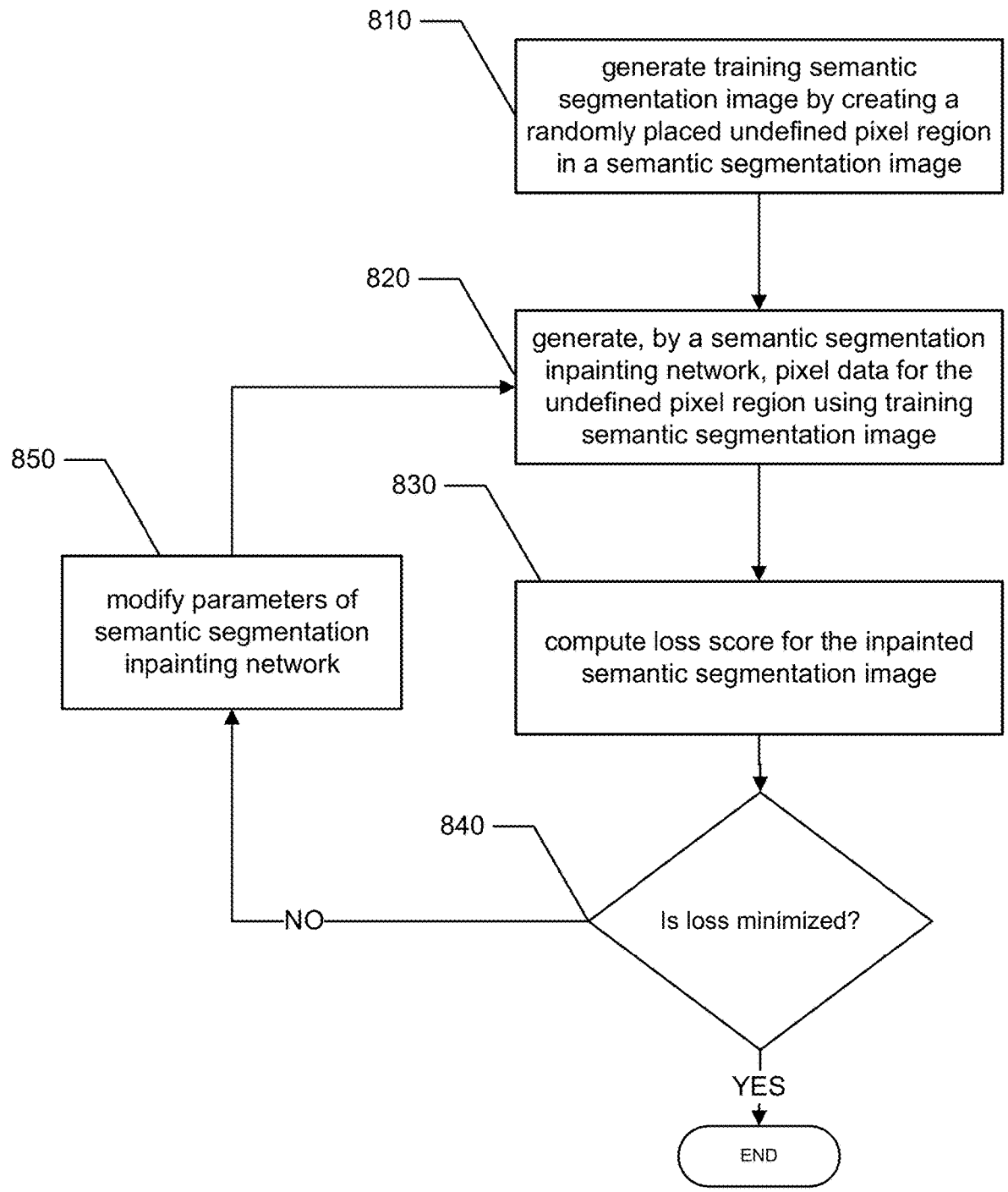
FIG. 8 is a flowchart conceptually illustrating a training method for a machine learning model that provides inpainting of holes in a semantic segmentation image according to examples of the present disclosure.

FIG. 8 is a flowchart that conceptually illustrates a training method for the semantic segmentation inpainting neural network according to certain embodiments. At the outset, in step 810, an ensemble of training images are generated from a set of semantic segmentation images by first cropping out the background of the images and then randomly masking off (i.e., generating undefined pixel regions) near the center of the image. The center location of the region used to generate the undefined pixel regions can vary randomly around the center of the image for each training image generated, e.g., the location can vary around the portion of the semantic segmentation image that includes hip and chest parts of the underlying subject.

In step 820, a semantic segmentation inpainting neural network is used to generate the missing data for the undefined pixel region and an inpainted semantic segmentation image is generated. Any type of neural network architecture can be employed without departing from the scope of the present disclosure. For example, a model employing a GAN architecture having an encoder-decoder generator can be employed to generate the inpaint data without departing from the scope of the present disclosure.

In step 830, the quality of the inpainted semantic segmentation image is determined by computing a loss score for the inpainted image. The loss score can be any suitable loss score computed using any suitable loss function. In some embodiments, the loss can be a weighted sum of two or more losses $E_1, E_2, \ldots E_n$. In some embodiments, $E_1$ can be the mean squared error between the estimated (inpainted) pixel values of the inpainted image and the corresponding real pixel values of the real image, and $E_2$ can be the binary cross entropy between the discriminator's score of D on the inpainted image and 1. As noted above, the discriminator has been trained to differentiate between real images and inpainted images by producing a score that parameterizes the discriminator's estimate as to how likely it is that the image being scored is a real image. For example, the discriminator can output a score that ranges from 0 to 1, with a value of 0 indicating that the discriminator has determined that the input image is inpainted or the discriminator can output a value of 1 to indicate that the discriminator has determined that the input image is real (i.e., not inpainted). While the training method described in this step relies on the discriminator score and the mean squared error between images, many other types error/cost functions can be used without departing from the scope of the present disclosure. For example, an average of a pixel-by-pixel distance measurement between the pixels of the real image and the inpainted image can be used (e.g., absolute RGB distance, L2 norm, and the like).

In step 840, a check is made to determine if the loss score is minimized. For example, if the loss score is minimized, the quality of the inpainted image is maximized for the chosen training image and thus, the training of the inpainting network can be terminated.

If the loss score is not minimized, the parameters of the neural network are modified in step 850. Once the network parameters are modified, the training process returns to step 820 and the inpainting process is repeated for the training image.

In some embodiments, steps 840 and 850 form one or more steps of an optimization problem, e.g., the inpainting network can be trained by minimizing the gradient of the loss with respect to the weights/parameters of the inpainting network. In some embodiments, a process of error back-propagation can be employed to modify the parameters of the neural network as part of the training/optimization. Additionally, in some embodiments, several different networks can be trained using different training images or batches of training images. Then, the final network can be chosen by selecting the network that produces the best results on a test set, e.g., by choosing the network that produces the smallest mean square error value using the test set.

Figure 9:
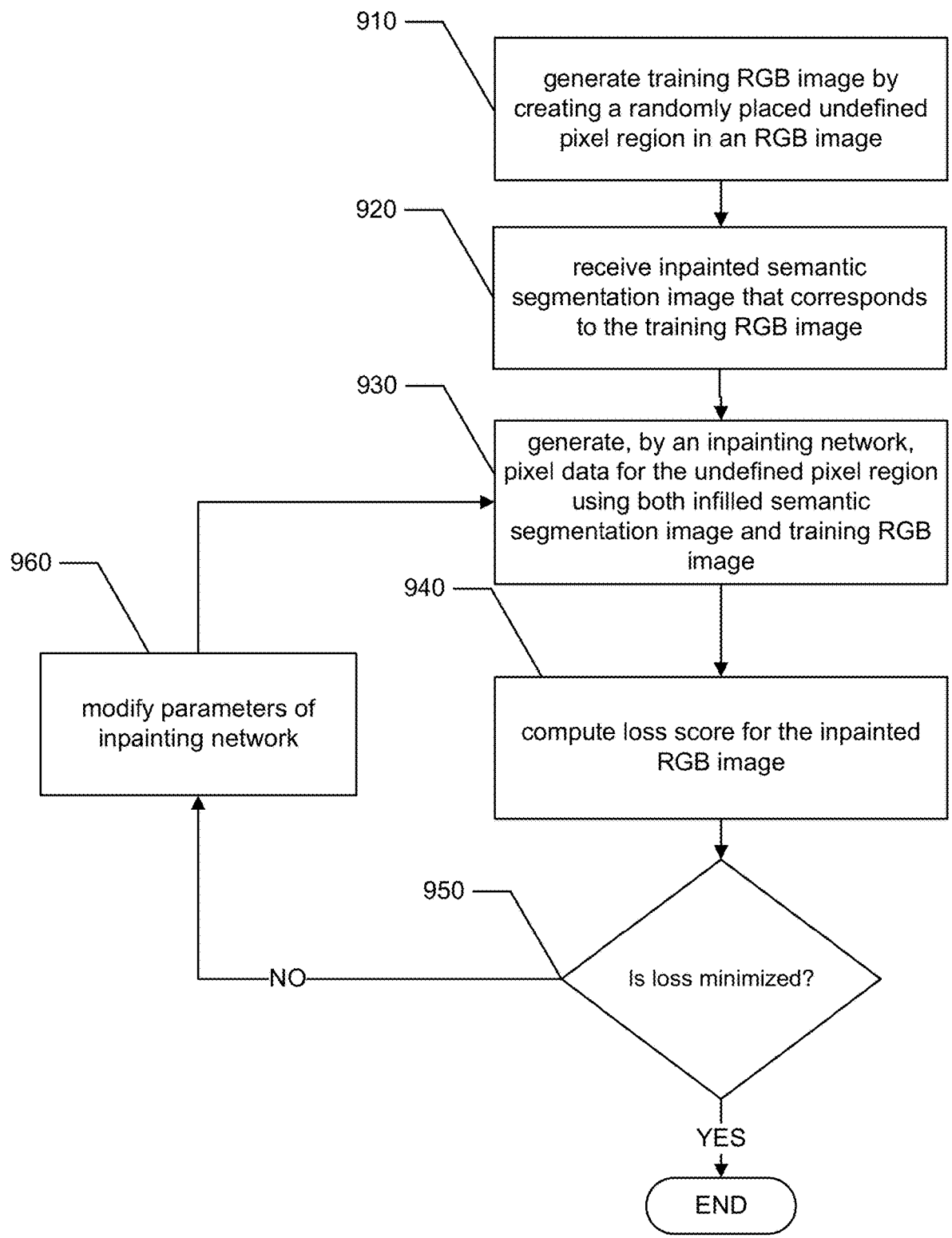
FIG. 9 is a flowchart conceptually illustrating a training method for a machine learning model that provides inpainting of holes in an RGB image according to examples of the present disclosure.

FIG. 9 is a flowchart that conceptually illustrates a training method for the RGB inpainting neural network according to certain embodiments. At the outset, in step 910, an ensemble of training images are generated from a training set of RGB images by first cropping out the background of the images and then randomly masking off (i.e., generating undefined pixel regions) near the center of the image. The center location of the region used to generate the undefined pixel regions can vary randomly around the center of the image for each training image generated, e.g., the location can vary around the portion of the RGB image that includes hip and chest parts of the underlying subject.

In step 920, an inpainted semantic segmentation image is received, where this image corresponds to an inpainted semantic segmentation image that is produced by the semantic segmentation filling network.

In step 930, an RGB inpainting neural network is used to generate the missing data for the undefined pixel region and an inpainted RGB image is generated. According to certain embodiments, the RGB inpainting neural network can use the inpainted semantic segmentation image to improve the RGB inpainting, e.g., by using the pixel categories in the inpainted semantic segmentation image to provide hints to the RGB inpainting neural network. Such hints can help add constraints to the parameter space by informing the network what type of pixel should be inpainted at what location in the undefined region, e.g., a pants pixel, a leg pixel, an arm pixel, etc. Any type of neural network architecture can be employed without departing from the scope of the present disclosure. For example, a model employing a GAN architecture having an encoder-decoder generator can be employed to generate the inpaint data without departing from the scope of the present disclosure.

The remaining steps 940, 950, and 960 proceed as already described above in reference to steps 830, 840, and 850, respectively, and thus the description will not be repeated here for the sake of conciseness.

In some embodiments, the training of the discriminator and one or more of the inpainting networks can be done in an alternating manner using the same training set of images. Such a training process can ensure that both the pixel estimation functionality of the inpainting network and the image discrimination functionality of the discriminator network constantly improve as the networks themselves evolve over time. More specifically, using the training of the inpainting network as an example, for each batch of training images, both the discriminator and the inpainting network can be trained. When the inpainting network is trained, the discriminator does not change and, likewise when the discriminator is trained, the inpainting network does not change. In some embodiments, the discriminator can be trained by computing a gradient of the loss with respect to the weights of the discriminator. The loss can be associated with any suitable loss function, e.g., the loss can be the binary cross entropy between the discriminator's score D on a training image and 1 (if the training image is a real image) or 0 (if the training image is an inpainted image).

While examples of training methods are set forth above, one or ordinary skill having the benefit of this disclosure will recognize that any training process for either the inpainting networks or the discriminators can be used without departing from the scope of the present disclosure.

Figure 10:
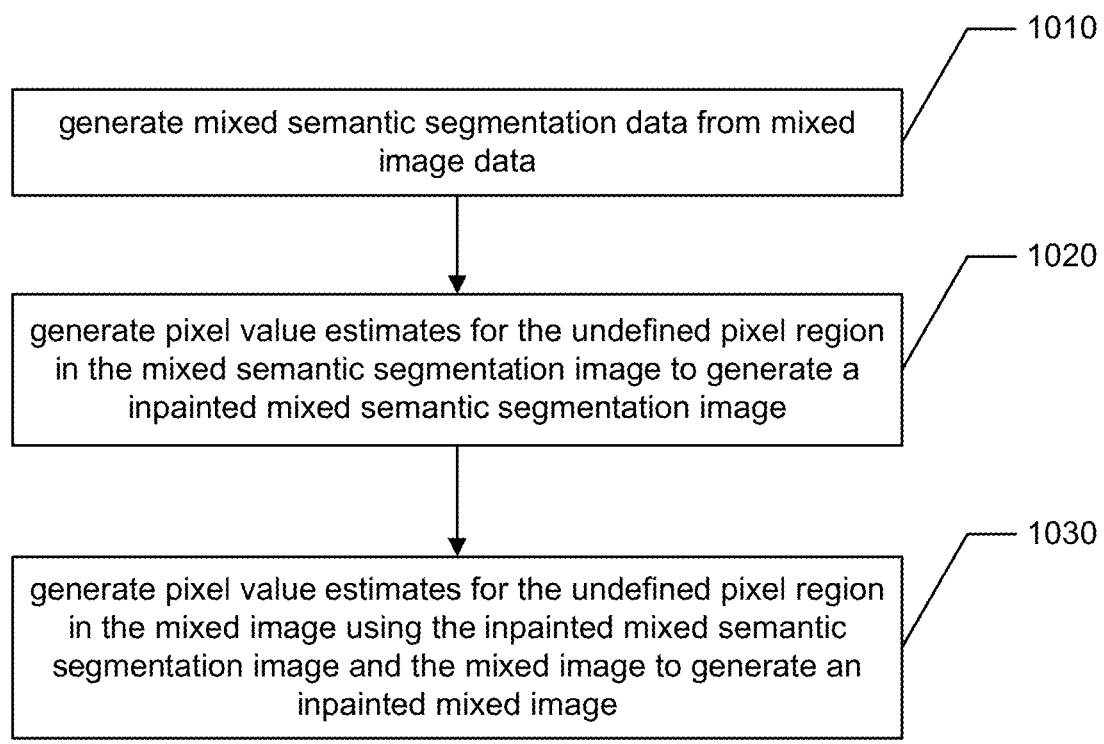
FIG. 10 is a flowchart conceptually illustrating an inpainting method that employs a machine learning model that provides inpainting of holes in a mixed image according to examples of the present disclosure.

FIG. 10, is a flowchart that conceptually illustrates a deep inpainting method according to examples of the present disclosure. Once the semantic segmentation inpainting neural network and the RGB inpainting neural network are trained, the trained networks may be used to inpaint mixed images, such as those described above in reference to FIG. 7. Such a method can be employed a part of step 360 as described above in reference to FIG. 3.

In step 1010, mixed semantic segmentation image data is generated from the mixed image data. In some embodiments, the mixed semantic segmentation data can take the form of a set of pixel values with each pixel corresponding to a pixel of the first or second image and taking a value that corresponds to a semantic category taken from the first or second semantic segmentation data. More specifically, the mixed semantic segmentation image pixel values can be generated from the set of first image pixel values and second image pixel values according to the combination rule defined by the mask data. In some cases, the mixed semantic segmentation image data can include one or more undefined pixel regions at corresponding locations to the undefined pixel regions in the mixed image, such as the undefined pixel region 711 described above in reference to FIG. 7.

In step 1020, pixel estimates for the undefined pixel region in the mixed semantic segmentation image are generated by the semantic segmentation inpainting neural network. According to certain embodiments, the semantic segmentation inpainting neural network receives as input a semantic segmentation image having one or more undefined pixel regions and outputs an inpainted semantic segmentation image. The semantic segmentation inpainting neural network can be trained as described above in reference to FIG. 8.

In step 1030, the RGB inpaint neural network generates pixel estimates for the undefined pixel region in the mixed RGB image. According to certain embodiments, the RGB inpainting neural network takes as input the inpainted semantic segmentation mixed image and also the mixed RGB image that include one or more undefined pixel regions and outputs and inpainted RGB mixed image, similar to image inpainted mixed image 715 shown in FIG. 7. The RGB neural network can be trained as described above in reference to FIG. 9.

FIG. 11 shows a block diagram of a user device, such as the user device 104 introduced above in reference to FIG. 1. As discussed above, the user device 104 can be a mobile device such as a smart phone, a digital camera, or any other form of digital image capture device. In the illustrated embodiment, the user device 104 includes processor(s) 1124 memory 1126. While the device in FIG. 11 is shown as a stand-alone device, one or more embodiments may implement the various hardware and software components within a more traditional mobile device such as a smart phone or on a personal computing device such as a laptop PC or a desktop PC as described above in reference to FIG. 1 above. The processor(s) 1124 may include multiple processors and/or a processor having multiple cores. Further, the processor(s) 1124 may comprise one or more cores of different types. For example, the processor(s) 1124 may include application processor units, graphic processing units, and so forth. In one implementation, the processor(s) 1124 may comprise a microcontroller and/or a microprocessor. The processor(s) 1124 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1124 may possess its own local memory, which also may store program components, program data, and/or one or more operating systems.

The memory 1126 may include volatile and nonvolatile memory, removable and non-removable media implemented in any method or technology for storage of information, such as computer-readable instructions, data structures, program component, or other data. Such memory 1126 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 1126 may be implemented as computer-readable storage media ("CRSM"), which may be any available physical media accessible by the processor(s) 1124 to execute instructions stored on the memory 1126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The user device 104 can include a microphone array that comprises one or more microphones 1102 to receive audio input, such as user voice input. The user device 104 also includes a speaker unit that includes one or more speakers 1104 to output audio sounds. The user device 104 can also include light elements 1122 (e.g., a light ring) and image sensor(s) 1120 (e.g., a depth sensor, a still camera, video camera, etc.).

One or more codecs 1106 can be coupled to the microphone(s) 1102 and the speaker(s) 1104 to encode and/or decode the audio signals. The codec may convert audio data between analog and digital formats. A user may interact with the user device 104 by speaking to it, and the microphone(s) 1102 captures sound and generates an audio signal that includes the user speech. The codec(s) 1106 encode the user speech and transfers that audio data to other components. The user device 104 can communicate back to the user by emitting audible statements through the speaker(s) 1104. In this manner, the user interacts with the user device 104 simply through speech, without use of a keyboard or display common to other types of devices.

In the illustrated example, the user device 104 includes one or more wireless interfaces 1108 coupled to one or more antennas 1110 (e.g., FPC antennas) to facilitate a wireless connection to a network. The wireless interface(s) 1108 may implement one or more of various wireless technologies, such as Wi-Fi Bluetooth, RF, and so on.

In some instances, one or more device interface(s) 1112 (e.g., USB, broadband connection, etc.) may further be provided as part of the user device 104 to facilitate a wired connection to a network, or a plug-in network device that communicates with other wireless networks. One or more 1 are further provided to distribute power to the various components on the user device 104.

The user device 104 is designed to support audio interactions with the user, in the form of receiving voice commands (e.g., words, phrase, sentences, etc.) from the user and outputting audible feedback to the user. Accordingly, in the illustrated implementation, there need not be any haptic input devices, such as navigation buttons, keypads, joysticks, keyboards, touch screens, and the like, but the user device 104 can further include these components without departing from the scope of the present disclosure. Likewise, there need not be a display for text or graphical output, but a display can be employed without departing from the scope of the present disclosure. In one implementation, the user device 104 may include non-input control mechanisms, such as basic volume control button(s) for increasing/decreasing volume, as well as power and reset buttons. There may also be one or more simple lighting elements (e.g., LEDs around perimeter of a top portion of the device) to indicate a state such as, for example, when power is on or to indicate when a command is received.

Several modules such as instruction, datastores, and so forth may be stored within the memory 1126 and configured to execute on the processor(s) 1124. An operating system module 1116 is configured to manage hardware and services (e.g., wireless unit, Codec, etc.) within and coupled to the user device 104 for the benefit of other modules. In addition, the memory 1126 may include the speech-recognition engine 1118. The speech-recognition engine 1118 performs speech recognition on audio signals generated based on sound captured by the microphone, such as utterances spoken by the user 102.

FIG. 12 a block diagram conceptually illustrating example components of a remote device, such as a remote server(s) 112 that may assist with image processing according to certain embodiments. Multiple such server(s) 112 may be included in the system, and in operation, each of these servers may include computer-readable and computer-executable instructions that reside on the respective server 112, as will be discussed further below.

Each of the servers 112 may include one or more controllers/processors 1204, that may each include a central processing unit (CPU) for processing data and computer-readable instructions, and a memory 1206 for storing data and instructions of the respective device. The memories 1206 may individually include volatile random access memory (RAM), non-volatile read only memory (ROM), non-volatile magnetoresistive (MRAM) and/or other types of memory. Each server may also include a data storage component 1208, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 1202.

Computer instructions for operating each server 1212 and its various components may be executed by the respective server's controller(s)/processor(s) 1204, using the memory 1206 as temporary "working" storage at runtime. A server's computer instructions may be stored in a non-transitory manner in non-volatile memory 1206, storage 1208, or an external device(s). Alternatively, some or all of the executable instructions may be embedded in hardware or firmware on the respective device in addition to or instead of software.

Each server 1212 includes input/output device interfaces 1202. A variety of components may be connected through the input/output device interfaces, as will be discussed further below. Additionally, each server 1212 may include an address/data bus 1224 for conveying data among components of the respective server. Each component within a server 1212 may also be directly connected to other components in addition to (or instead of) being connected to other components across the bus 1224. Through the network(s) 1299, the image processing system may be distributed across a networked environment. The server(s) 1212 may include an image processing module 1250. The image processing module 1250 may include the machine learning models, e.g., convolutional neural networks, for performing any of the image processing described above, e.g., clothes semantic segmentation, semantic segmentation image inpainting, RGB image inpainting, and the like. The server(s) 1212 may also include a command processor 1290 that is configured to execute commands/functions associated with user input, e.g., a spoken command to produce a mixed image having a particular outfit, as described above.

The server may include a model training component 1270. Various machine learning techniques may be used to perform various steps described above, such as semantic segmentation of the images and inpainting. Models may be trained and operated according to various machine learning techniques. Such techniques may include, for example, neural networks (such as deep neural networks and/or recurrent neural networks and/or convolutional neural networks), inference engines, trained classifiers, etc. Various techniques may be used to train the models including backpropagation, statistical learning, supervised learning, semi-supervised learning, stochastic learning, or other known techniques.

Storage media or computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

Some or all of the process described herein (or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a first image that represents a first person wearing a shirt and a skirt;
   obtaining a second image that represents a second person wearing a top and pants;
   generating a mixed image that represents the first person wearing the shirt and the pants, wherein generating the mixed image includes:

determining first semantic segmentation data for the first image, wherein the first semantic segmentation data identifies pixel locations for at least a head, arms, hands, and the shirt of the first person;

determining second semantic segmentation data for the second image, wherein the second semantic segmentation data identifies pixel locations for at least the pants of the second person;

determining a pose-aligned second image;

determining mask data using the first image, the pose-aligned second image, and the first and second semantic segmentation data; and determining pixel values of the mixed image by combining pixel values from the first image with pixel values of the pose-aligned second image based on the mask data;

wherein determining the pose-aligned second image includes:

determining, using pose data, a first pose of the first person and a second pose of the second person;

determining a scaled second image by scaling the second image such that a height of the second person substantially equals a height of the first person, wherein the height of the first person and the height of the second person are determined using the first and second semantic segmentation data, respectively; and rotating and translating the scaled second image to align the second pose to the first pose, and wherein determining the mask data comprises:

based on the first semantic segmentation data, assigning a value of 1 to mask pixels that correspond to the head, arms, hands, and shirt of the first person; and based on the second semantic segmentation data, assigning a value of 0 to mask pixels that correspond to the pants of the second person.

2. The computer-implemented method of claim 1, wherein, in the second image, a portion of the pants is obscured by the top, thereby causing a first undefined pixel region in a mixed semantic segmentation image and a second undefined pixel region in the mixed image, the method further comprising:

determining the mixed semantic segmentation image, wherein pixel values in the first undefined pixel region are generated by a first neural network; and determining the mixed image, wherein pixel values in the second undefined pixel region are generated by a second neural network using the mixed semantic segmentation image.

3. A computer-implemented method, comprising:

receiving first pose data for a first human represented in a first image;

receiving second pose data for a second human represented in a second image;

receiving first semantic segmentation data for the first image;

receiving second semantic segmentation data for the second image;

generating a pose-aligned second image by modifying the second image based on the first pose data, the second pose data, the first semantic segmentation data, and the second semantic segmentation data;

generating mask data, using the first and second semantic segmentation data, wherein the mask data defines a set of conditions for combining pixels of the first image with pixels of the pose-aligned second image; and determining a mixed image by combining pixel values from the first image and pixel values of the pose-aligned second image according to the mask data, wherein the mixed image includes a representation of an outfit that includes first clothing represented in the first image and second clothing represented in the second image.

4. The computer-implemented method of claim 3, wherein determining the mixed image includes:

determining, based on the first semantic segmentation data, a first set of mixed image pixel values to be equal to a first set of pixel values of the first image, wherein the first set of pixel values of the first image are from pixels categorized as head pixels, hand pixels, and top clothing pixels; and determining, based on the second semantic segmentation data, a second set of mixed image pixel values to be equal to a second set of pixel values from the second image, wherein the second set of pixel values from the second image are from pixels categorized as feet pixels and bottom clothing pixels.

5. The computer-implemented method of claim 4, wherein determining the mixed image includes:

for a background blending region of the mixed image, determining, based on the first and second semantic segmentation data, a third set of mixed image pixel values that are combinations of background pixel values from the first image and the second image.

6. The computer-implemented method of claim 3, wherein the first clothing is a bottom piece of clothing and the second clothing is a top piece of clothing.

7. The computer-implemented method of claim 3, wherein generating a pose-aligned second image includes:

determining a height of the first human based on the first semantic segmentation data;

determining a height of the second human based on the second semantic segmentation data; and scaling the second image such that a scaled height of the second human substantially equals the height of the first human.

8. The computer-implemented method of claim 7, wherein generating a pose-aligned second image further includes:

rotating and translating the second image, based on the first and second pose data, to align a pose of the second human with a pose of the first human.

9. The computer-implemented method of claim 3, wherein the second clothing includes bottom clothing and a portion of the bottom clothing is obscured by a portion of a top clothing in the second image, causing a first undefined pixel region in a mixed semantic segmentation image and a second undefined pixel region in the mixed image, the method further comprising:

determining the mixed semantic segmentation image, wherein mixed semantic segmentation image pixel values in the first undefined pixel region are generated by a first neural network; and determining the mixed image, wherein mixed image pixel values in the second undefined pixel region are generated by a second neural network using the mixed semantic segmentation image.

10. The computer-implemented method of claim 9, further comprising:

determining, by an image discriminator, a quality score for the mixed image;

determining, by the image discriminator, that the quality score is above a threshold; and displaying, on a display, the mixed image.

11. A computer-implemented method, comprising:
- receiving a first image representing a first person wearing first clothing;
- receiving a second image representing a second person wearing second clothing;
- receiving first semantic segmentation data for the first image;
- receiving second semantic segmentation data for the second image; and
- wherein a portion of the second clothing represented in the second image is obscured by other clothing, causing a first undefined pixel region in a mixed image and a second undefined pixel region in a mixed semantic segmentation image, wherein the mixed image includes a representation of an outfit that includes the first clothing represented in the first image and the second clothing represented in the second image;
- determining the mixed semantic segmentation image based on the first and the second semantic segmentation data; and
- determining the mixed image, wherein mixed image pixel values in the first undefined pixel region are generated by a first neural network and based on the mixed semantic segmentation image.

12. The computer-implemented method of claim 11, further comprising:
- determining the mixed semantic segmentation image, wherein mixed semantic segmentation image pixel values in the second undefined pixel region are generated by a second neural network; and
- wherein the first neural network generates the mixed image pixel values in the second undefined pixel region based on the mixed semantic segmentation image generated by the second neural network.

13. The computer-implemented method of claim 12, wherein the second clothing is a bottom piece of clothing and the other clothing is a top piece of clothing.

14. The computer-implemented method of claim 11, wherein the first clothing is a bottom piece of clothing and the second clothing is a top piece of clothing.

15. The computer-implemented method of claim 12, further comprising:
- determining, by an image discriminator, a quality score for the mixed image;
- determining, by the image discriminator, that the quality score is above a threshold; and
- displaying, on a display, the mixed image.

16. The computer-implemented method of claim 11, further comprising:
- determining, based on the first semantic segmentation data, a first set of mixed image pixel values to be equal to a first set of pixel values of the first image, wherein the first set of pixel values of the first image are from pixels categorized as head pixels, hand pixels, and top clothing pixels; and
- determining, based on the second semantic segmentation data, a second set of mixed image pixel values to be equal to a second set of pixel values from the second image, wherein the second set of pixel values from the second image are from pixels categorized as feet pixels and bottom clothing pixels.

17. The computer-implemented method of claim 16, wherein determining the mixed image includes:
- for a background blending region of the mixed image, determining, based on the first and second semantic segmentation data, a third set of mixed image pixel values that are combinations of background pixel values from the first image and the second image.

18. The computer-implemented method of claim 11, further comprising:
- receiving first pose data for a first human represented in a first image;
- receiving second pose data for a second human represented in a second image;
- generating a pose-aligned second image by modifying the second image based on the first pose data, the second pose data, the first semantic segmentation data, and the second semantic segmentation data; and
- determining the mixed image by combining pixel values from the first image and pixel values of the pose-aligned second image.

19. The computer-implemented method of claim 18, wherein generating a pose-aligned second image includes:
- determining a height of the first human based on the first semantic segmentation data;
- determining a height of the second human based on the second semantic segmentation data; and
- scaling the second image such that a scaled height of the second human substantially equals the height of the first human.

20. The computer-implemented method of claim 19, wherein generating a pose-aligned second image further includes:
- rotating and translating the second image, based on the first and second pose data, to align a pose of the second human with a pose of the first human.

* * * * *